R. C. BROWNE.
LAMP MECHANISM FOR AUTOMOBILES.
APPLICATION FILED MAR. 7, 1913.
1,093,383.
Patented Apr. 14, 1914.
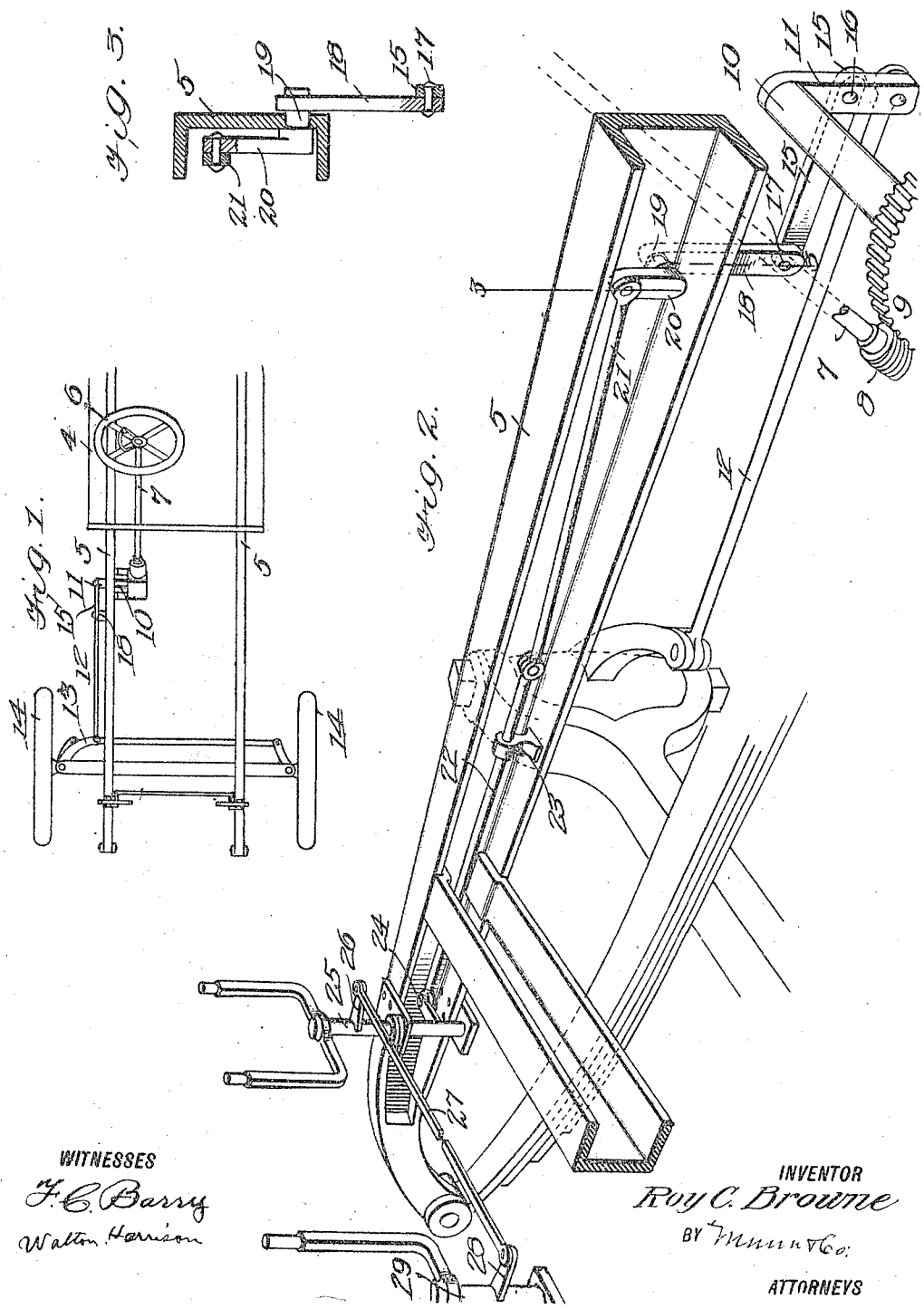
WITNESSES
F. C. Barry
Walton Harrison
INVENTOR
Roy C. Browne
BY Munn & Co.
ATTORNEYS

UNITED STATES PATENT OFFICE.

ROY C. BROWNE, OF EAST ST. LOUIS, ILLINOIS.

LAMP MECHANISM FOR AUTOMOBILES.

1,093,383.

Specification of Letters Patent. Patented Apr. 14, 1914.

Application filed March 7, 1913. Serial No. 752,618.

*To all whom it may concern:*

Be it known that I, ROY C. BROWNE, a citizen of the United States, and a resident of East St. Louis, in the county of St. Clair and State of Illinois, have made certain new and useful Improvements in Lamp Mechanism for Automobiles, of which the following is a specification.

My invention relates to lamp mechanism for automobiles, my more particular purpose being to provide a lamp mechanism controllable automatically by the steering wheels and parts connected immediately therewith so that when the steering wheel is turned the lamps of the vehicle are turned to correspond with the angular direction in which the vehicle is turning.

Reference is made to the accompanying drawing forming part of this specification and in which like letters indicate like parts.

Figure 1 is a plan view showing my improved lamp mechanism as applied to an automobile. Fig. 2 is a fragmentary perspective view showing the working parts of the lamp mechanism. Fig. 3 is a section on the line 3—3 of Fig. 2 looking in the direction of the arrow.

The automobile body is shown at 4 and is provided with a frame 5, these parts being of the usual or any desired construction.

The steering wheel is shown at 6. The steering post is shown at 7; the worm carried by the steering post at 8 and at 9 is a worm gear which is mounted rigidly upon a shaft 10, conveniently designated as the worm gear shaft. Mounted rigidly upon this shaft and extending downwardly from it is an arm 11. Pivotally connected with this arm is a steering rod 12, which is also connected to the steering arm 13 which controls the front wheels 14. A link 15 is by aid of a pivot pin 16 connected with the arm 11. This link is also connected by a pivot pin 17 with an arm 18. This arm is mounted rigidly upon a rocking shaft 19 which extends through the frame 5. This frame is substantially of U-shape in cross section as will be understood from Fig. 2. Mounted rigidly upon the shaft 9 and extending upwardly from it is a crank 20 and pivotally connected with the latter is a connecting rod 21. A slide rod 22 is pivotally connected with the rod 21 and is supported in bearings 23. The slide rod 22 is pivotally connected with an arm 24 which is rigidly mounted upon a lamp bracket 25, the latter having the form of a fork and being adapted to turn. The lamp bracket 25 carries an arm 26 and connected with the latter is a pitman 27 which extends across the machine and is pivotally connected to an arm 28, the latter being carried by another bracket 29. The two lamp brackets thus connected are adapted to move in unison.

The operation of my device is as follows: The steering wheel 6 being turned so as to cause the worm 8 to actuate the worm gear 9 so that the shaft 10 is turned or rocked, the motion is communicated by the arms 11 and steering rod 12 to the front wheels of the vehicle. The link 15 is actuated by the adjacent arm 11 causing the arm 18 and shaft 19 to rock, the crank 20 being thus rocked also. Motion is communicated from the crank 20 through the connecting rod 21 to the slide rod 22 and thence to the two lamp brackets which are thus turned in the same direction as the front wheels are shifted angularly by the steering gear.

I claim:—

1. A lamp mechanism for automobiles, comprising a vehicle body provided with a frame of substantially U form in cross section, a crank located within said U frame and adapted to rock, steering mechanism for the vehicle, connections from said steering mechanism to said crank for the purpose of actuating the latter, a connecting rod pivotally connecting with said crank and located within said frame, a sliding rod pivotally connected with said connecting rod and likewise located within said frame, and a lamp bracket provided with an arm extending into said frame and connected with said sliding rod for the purpose of enabling said lamp bracket to be turned by the steering mechanism.

2. In a lamp mechanism for automobiles, the combination of a steering mechanism, an arm connected therewith and movable thereby, means for actuating said arm, a link pivotally connected with said arm, another arm pivotally connected with said link, a rocking shaft secured rigidly to said last-mentioned arm, a frame to which said rocking shaft is journaled, a crank connected with said rocking shaft, a pitman pivotally connected with said crank, a sliding rod pivotally connected with said pitman, and a lamp bracket provided with an arm, this arm being pivotally connected with said sliding rod.

ROY C. BROWNE.

Witnesses:
WALTON HARRISON,
DAVID L. HAZARD.